United States Patent
Kobayashi et al.

(10) Patent No.: US 7,275,786 B2
(45) Date of Patent: Oct. 2, 2007

(54) VEHICLE SEAT

(75) Inventors: Yuki Kobayashi, Takanezawa-machi (JP); Tsutomu Matsuzaki, Takanezawa-machi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 11/458,874

(22) Filed: Jul. 20, 2006

(65) Prior Publication Data
US 2007/0029852 A1 Feb. 8, 2007

(30) Foreign Application Priority Data
Jul. 21, 2005 (JP) .............................. 2005-211909

(51) Int. Cl.
*A47C 31/00* (2006.01)
(52) U.S. Cl. ............ 297/182; 297/228.11; 297/228.12; 297/463.2
(58) Field of Classification Search ................ 297/182, 297/228.11, 228.12, 463.1, 463.2
See application file for complete search history.

(56) References Cited

U.S. PATENT DOCUMENTS 5,161,854 A * 11/1992 Yokoto et al. .............. 297/182

6,394,542 B2 * 5/2002 Potisch et al. .......... 297/182 X

FOREIGN PATENT DOCUMENTS

JP 8-276770 10/1996

* cited by examiner

*Primary Examiner*—Anthony D. Barfield
(74) *Attorney, Agent, or Firm*—Shoemaker and Mattare

(57) ABSTRACT

A vehicle seat includes a seat cushion, a seat back supported to the seat cushion in such a manner that a space is left between a rear end portion of the seat cushion and a lower end portion of the seat back, a concealing cover member for concealing the space from a rear side of the vehicle seat, the concealing cover member having upper and lower sections, the concealing cover member being attached at an upper edge portion of the upper section thereof to a lower portion of a back of the seat back so as to hang from the back of the seat back, and at least one elastic belt having first and second ends, the first end of the at least one elastic belt being attached to a lower edge portion of the lower section of the concealing cover member, wherein the lower section of the concealing cover member is extended toward a location under the seat cushion and the second end of the at least one elastic belt is attached to a bottom portion of the seat cushion, so that the space between the rear end portion of the seat cushion and the lower end portion of the seat back can be concealed by the concealing cover member.

12 Claims, 5 Drawing Sheets

VEHICLE SEAT

The entire disclosure of Japanese Patent Application No. 2005-211909, filed on Jul. 21, 2005, is expressly incorporated by the reference herein.

BACKGROUND OF THE INVENTION

1. Field of the Invention

The present invention relates to a vehicle seat which comprises a seat cushion, a seat back supported to the seat cushion in such a manner that a space is left between a rear end portion of the seat cushion and a lower end portion of the seat back, and a cover means for concealing the space between the seat cushion and the seat back from a rear side of the vehicle seat in order to add the appearance of the vehicle seat.

2. Description of the Related Art

In the field of vehicle seats, there has been known a vehicle seat which comprises a seat cushion, a seat back pivotally supported to the seat cushion in such a manner that a space is left between a rear end portion of the seat cushion and a lower end portion of the seat back, a cover for concealing the space between the seat cushion and the seat back from a rear side of the vehicle seat, and a pair of spaced apart leg members attached to the seat cushion (Japanese Patent Application Laid-Open No. Hei. 8-276770). The vehicle seat further includes a pair of spaced apart recliner devices provided at both sides of the vehicle seat for allowing the seat back to be pivoted relative to the seat cushion. A connecting shaft interconnects the spaced apart recliner devices.

In the conventional vehicle seat, the cover is sewed at an upper end portion thereof to a lower portion of a back of the seat back, extends around the rear end portion of the seat cushion from the seat back, and is caught at a lower end portion thereof by a supporting wire which is stretched between the spaced apart leg members. More particularly, the cover comprises a cover body which is provided with a clamp member having the shape of an Ohm symbol in cross-section, the clamp being attached to a substantially middle region of the cover body so as to extend along a width of the cover body, and a hook member having a substantially J-shape as viewed from the side, the hook member being attached to the lower end portion of the cover body. The cover is provided at the vehicle seat by causing the upper end portion of the cover body to be sewed to the lower portion of the back of the seat back as discussed above, causing the clamp member to be fixedly fitted on the connecting shaft interconnecting the spaced apart recliner devices, and causing the hook member to be caught by the supporting wire stretched between the spaced apart leg members.

Generally, transporting of a vehicle seat of this type, for example, the transporting of the vehicle seat into a vehicle body for causing the vehicle seat to be mounted on a floor of the vehicle body is carried out utilizing a lifter. More particularly, the transporting of the vehicle seat is performed while causing a tip end portion of a lifting arm of the lifter to be inserted through a space between a rear end portion of a seat cushion and a lower end portion of a seat back of the vehicle seat and causing the entire vehicle seat to be lifted up by the lifting arm.

However, when the conventional vehicle seat described above is to be transported, it is impossible to cause the tip end portion of the lifting arm to be inserted through the space between the seat cushion and the seat back, since the cover body is fixed to the connecting shaft through the clamp member and prevents the tip end portion of the lifting arm from being inserted through the space between the seat cushion and the seat back.

SUMMARY OF THE INVENTION

The present invention has been made with a view to overcoming the forgoing problem of the prior art vehicle seat.

It is therefore an object of the present invention to provide a vehicle seat which comprises a seat cushion, a seat back supported to the seat cushion in such a manner that a space is left between a rear end portion of the seat cushion and a lower end portion of the seat back, and a concealing cover means for concealing the space between the seat cushion and the seat back, and which facilitates transporting of the vehicle seat by a lifter.

It is another object of the present invention to provide a vehicle seat which comprises a seat cushion, a seat back supported to the seat cushion in such a manner that a space is left between a rear end portion of the seat cushion and a lower end portion of the seat back, and a concealing cover means for concealing the space between the seat cushion and the seat back, and in which the concealing cover means is simple in structure and can be easily attached to the vehicle seat.

It is still another object of the present invention to provide a vehicle seat which comprises a seat cushion, a seat back supported to the seat cushion in such a manner that a space is left between a rear end portion of the seat cushion and a lower end portion of the seat back, and a concealing cover means for concealing the space between the seat cushion and the seat back, and in which the concealing cover means can be prevented from being damaged and can be attached to the vehicle seat while adding to the appearance of the vehicle seat.

In accordance with the present invention, there is provided a vehicle seat. The vehicle seat comprises a seat cushion, a seat back supported to the seat cushion in such a manner that a space is left between a rear end portion of the seat cushion and a lower end portion of the seat back, a concealing cover means for concealing the space from a rear side of the vehicle seat, the concealing cover means having upper and lower sections, the concealing cover means being attached at an upper edge portion of the upper section thereof to a lower portion of a back of the seat back so as to hang from the back of the seat back, and at least one elastic belt having first and second ends, the first end of the at least one elastic belt being attached to a lower edge portion of the lower section of the concealing cover means. In the vehicle seat, the lower section of the concealing cover means is extended toward a location under the seat cushion and the second end of the at least one elastic belt is attached to a bottom portion of the seat cushion, so that the space between the rear end portion of the seat cushion and the lower end portion of the seat back can concealed by the concealing cover means.

The seat cushion may include a seat cushion frame having front and rear frame sections, and cushion springs stretched between the front and rear frame sections. The second end of the at least one elastic belts is provided with a hook means having a hooking section of a substantially J-shape as viewed from the side, the hooking section being caught by one of the cushion springs.

The at least one elastic belt may have a length which allows the at least one belt to extend to a forward section of the seat cushion from the concealing cover means, be returned back and extend rearward. The at least one elastic belt may be provided with first and second hook means, the first hook means including a slit and a first hook section, the at least one elastic belt being received through the slit of the first hook means, the second hook means including a second hooking section and attached to the second end of the at least one elastic belt, the first hooking section being caught by a region of the bottom portion of the seat cushion which is adjacent the forward portion of the seat cushion, and the second hooking section being caught by a region of the bottom portion of the seat cushion which is adjacent the rear portion of the seat cushion.

The number of the at least one elastic belt may be plural. The concealing cover means may be reinforced by a lining plate which is attached onto an inner surface of the concealing cover means.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals designate the same parts throughout the Figures and wherein.

DETAILED DESCRIPTION

Figure 1:
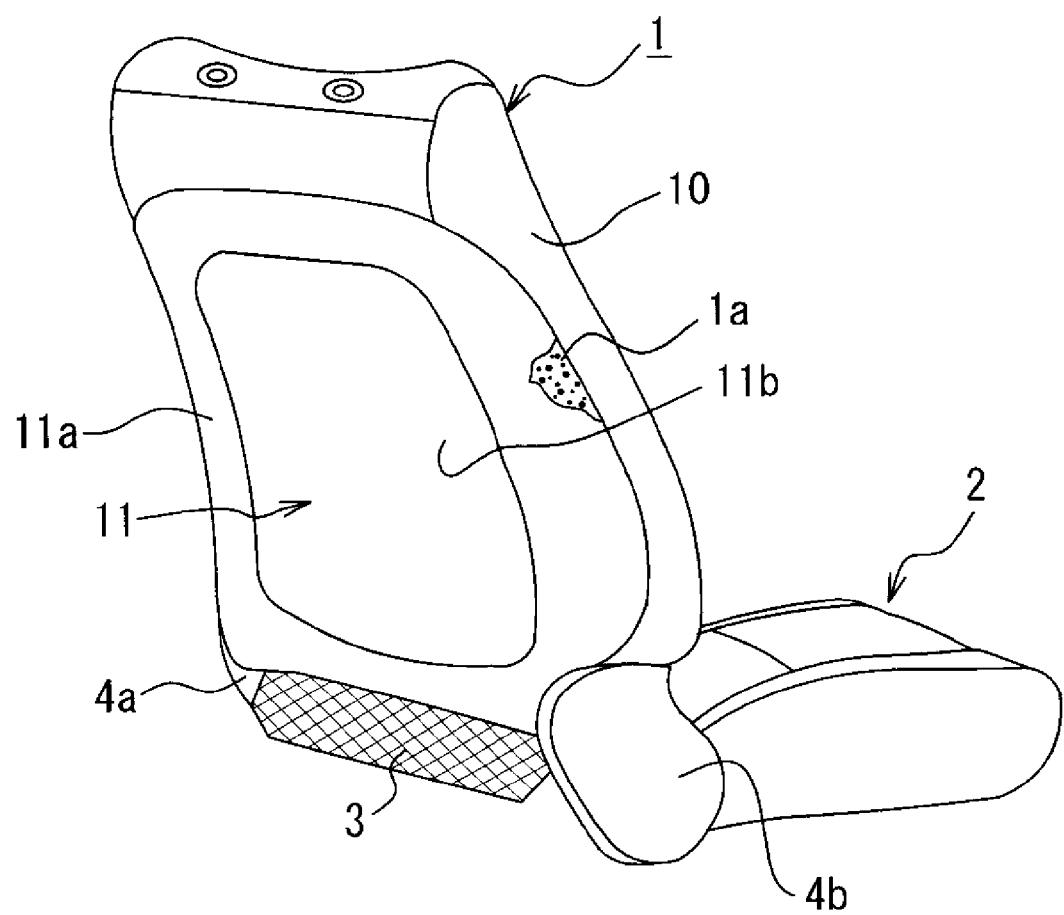
FIG. 1 is a schematic perspective view of a vehicle seat with a concealing cover means according to the present invention, as viewed from the back.

Referring now to FIG. 1, there is illustrated an individual seat for a vehicle according to an embodiment of the present invention. The vehicle seat comprises a seat back 1, a seat cushion 2, the seat back 1 being supported to the seat cushion 2 in such a manner that a space is left between a lower end portion of the seat back 1 and a rear end portion of the seat cushion 2, a concealing cover means 3 (indicated in FIG. 1 by net-form lines) provided between left and right side brackets 4a, 4b for concealing the space between the seat back 1 and the seat cushion 2 from a rear side of the vehicle seat.

The seat back 1 comprises a seat back frame (not shown), a cushioned padding 1a supported by the seat back frame, a cover 10 covering front, upper, right and left sides of the cushioned padding, and a back trim 11 covering a region of the cushioned padding 1a which includes a back side of the cushioned padding and the right and left side sections of the cushioned padding. The back trim 11 comprises a substantially ring-shaped trim frame 11a formed by any suitable resinous-material, and a trim sheet 11b attached at a peripheral portion thereof to an inner peripheral portion of the trim frame 11a by a pair of lower and upper hem members which will be discussed in greater detail hereinafter. The trim frame 11a comprises spaced apart side sections, an upper section interconnecting upper regions of the side sections of the trim frame 11a, and a lower section interconnecting lower regions of the side sections of the trim frame 11a.

Figure 2:
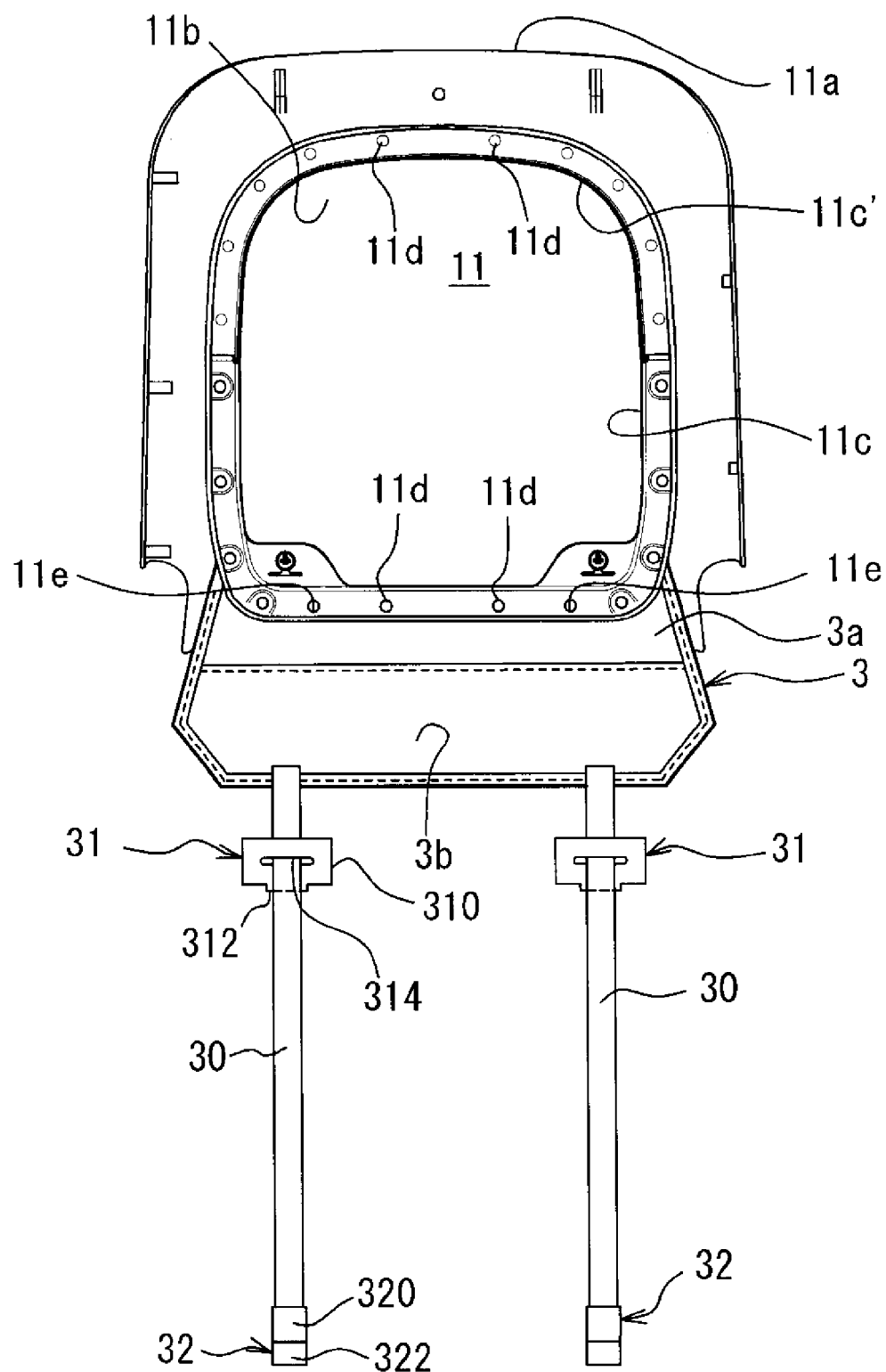
FIG. 2 is a schematic front view of a back trim for a seat back, in which the concealing cover means of FIG. 1 is attached to the back trim.

Referring to FIG. 2, the trim frame 11a has a plurality of spaced apart projecting pins 11d which are provided around the inner peripheral portion of the trim frame 11a and vertically project from the trim frame 11a. The lower and upper hem members 11c, 11c' are formed with spaced apart holes 11e which correspond in number to the projecting pins 11d. The attaching of the trim sheet 11b to the trim frame 11a is carried out by causing the trim sheet 11b to be superposed on the trim frame 11a, causing the projecting pins 11d of the trim frame 11a to be penetrated through the peripheral portion of the trim sheet 11b, applying the upper and lower hem member 11c, 11c' onto the trim frame 11a so as to cause the holes 11e of the lower and upper hem members 11c, 11c' to be fitted on corresponding projecting pins 11d projecting through the peripheral portion of the trim sheet 11b, and causing tip end portions of the projecting pins 11d to be riveted over the hem members 11c, 11c' by welding the tip end portions of the projecting pins 11d.

The concealing cover means 3 comprises a cover body 3a which is formed of a needle-punched fabric. The substantially lower half of the cover body 3a is reinforced by a lining plate 3b which is attached onto an inner surface of the lower half of the cover body 3a. The lining plate 3b is formed of any suitable resinous-material and has a thickness of about 1 mm. The lining plate 3b is attached onto the inner surface of the lower half of the cover body 3a by causing an upper edge portion of the lining plate 3b to be sewed to the cover body 3a along an entire width of the cover body 3a, causing peripheral edge portions of the cover body 3a to be folded over peripheral edge portions of the lining plate 3b, and causing the peripheral edge portions of the lining plate 3b to be sewed together with the folded-over edge portions of the cover body 3a.

The concealing cover means 3 is attached at an upper edge portion of the cover body 3a thereof to a lower portion of the trim frame 11a by the lower hem member 11c so as to hang from the trim frame 11a, when the trim sheet 11b is attached to the trim frame 11a by the hem members 11c, 11c'. More particularly, the attaching of the concealing cover means 3 to the lower portion of the trim frame 11a is performed by causing the upper edge portion of the cover body 3a to be superposed on a lower edge portion of the trim sheet 11b, causing corresponding projecting pins 11d of the trim frame 11a to be penetrated through the lower edge portion of the trim sheet 11b and the upper edge portion of the cover body 3a, causing the holes of the lower hem member 11c to be fitted on tip end portions of the corresponding projecting pins 11d, and causing the tip end portions of the projecting pins 11d to be riveted over the lower hem member 11c by welding the tip end portions of the projecting pins 11d.

The concealing cover means 3 is provided with a pair of elastic belts 30 which are spaced apart from each other at a predetermined interval and attached at one ends thereof to a lower edge portion of the cover body 3a. The belts 30 have the same length which allows the belts to extend to a forward section of the seat cushion 2 from the cover body 3a, be returned back and extend rearward. Each of the belts 30 is provided with first and second hook means 31, 32.

Figure 3:
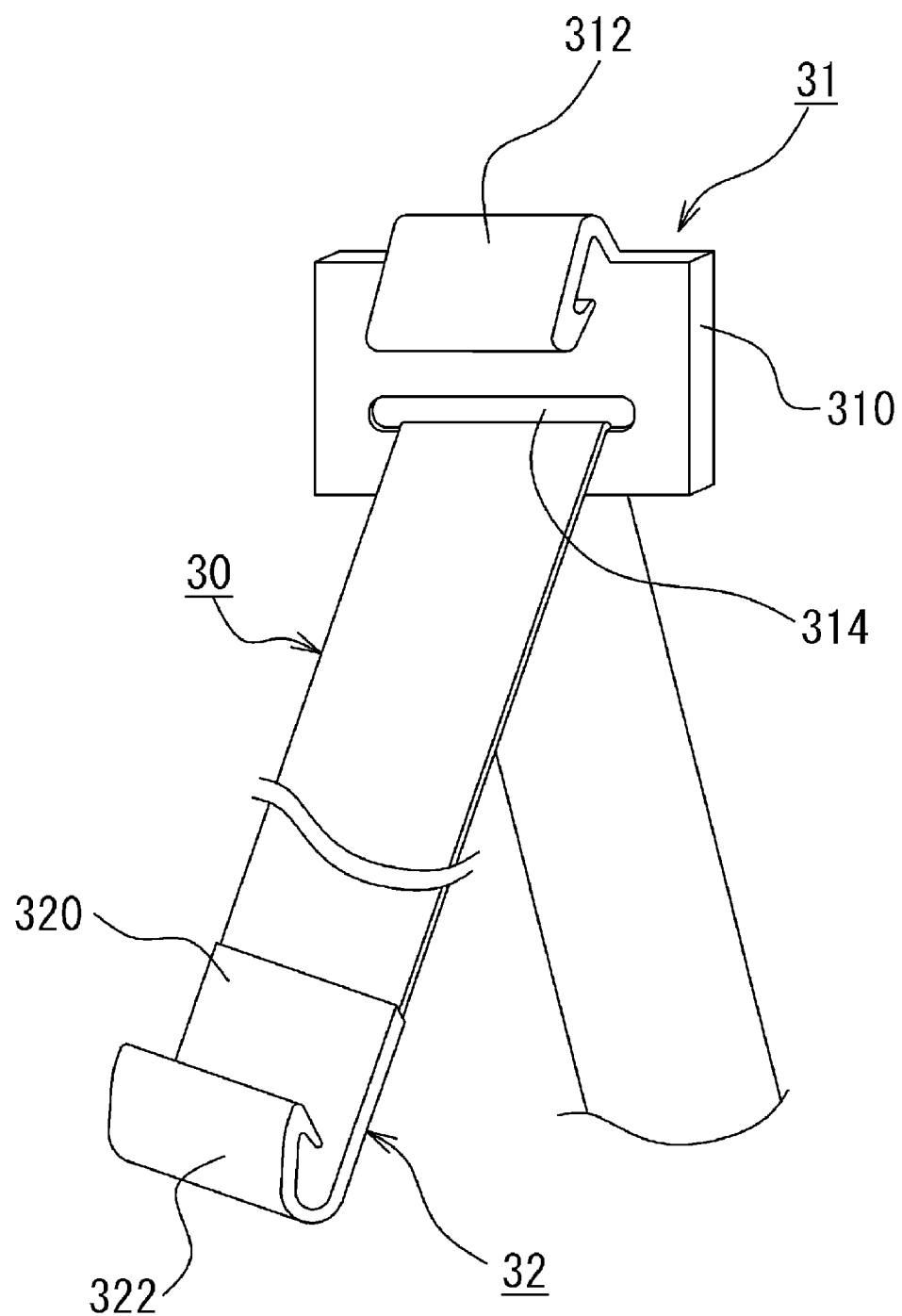
FIG. 3 is a schematic perspective view showing first and second hook means which are provided at a belt.

Referring now to FIG. 3, the first hook means 31 comprises a hook base 310 of a substantially rectangular-shape, and a hooking section 312 of a substantially J-shape as viewed from the side, the hooking section 312 being provided at one side of the hook base 310 and bent so as to extend from the side of the hook base 310 toward a surface of the hook base 310. The hook base 300 is formed with a slit 314. The belt 30 is inserted through the slit 314 of the first hook means 31. The second hook means 32 is formed into a substantially J-shape as viewed from the side, and comprises a base portion 320 attached to the other end of a corresponding belt 30, and a hooking section 322 integrated with the base portion 320 and bent so as to extend from the base portion 320 toward a surface of the base portion 320.

Figure 4:
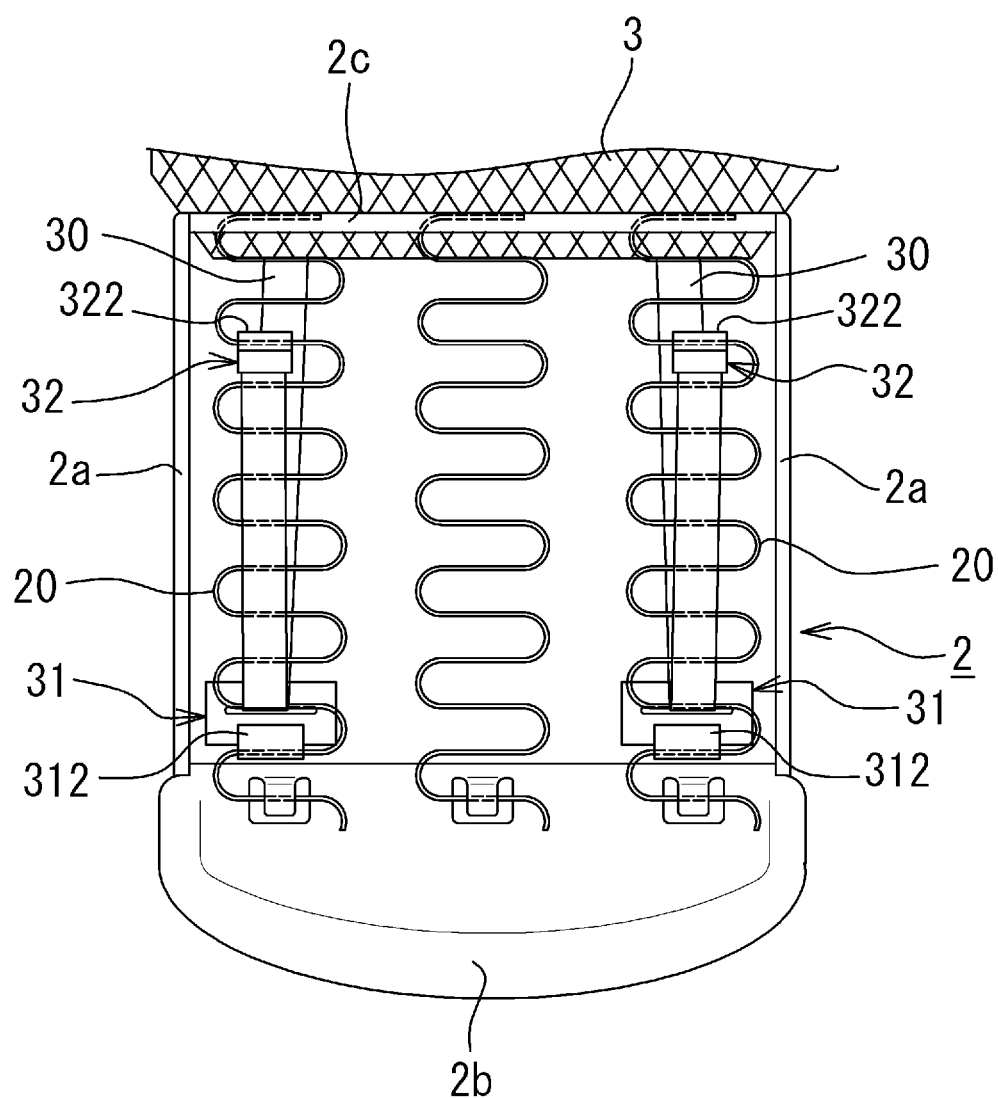
FIG. 4 is a schematic plan view showing a seat cushion frame for a seat cushion to which the concealing cover means is coupled.

Referring to FIG. 4, there is illustrated a seat cushion frame for the seat cushion 2. In the illustrated example, the seat cushion frame comprises a pair of spaced apart side frame sections 2a, a pan frame section 2b provided between forward end portions of the side frame sections 2a, a cross shaft 2c interconnecting rear end portions of the side frame sections 2a, and a plurality of zigzag springs 20 serving as cushion springs. The zigzag springs 20 are stretched between the pan frame section 2b and the cross shaft 2c. In the illustrated example, three zigzag springs 20 are employed.

The belts 30 extending from the concealing cover means 3 are coupled to two of the zigzag springs 20 by means of the first and second hook means 31, 32 after the vehicle seat is assembled. More particularly, the coupling of the belts 30 to the zigzag springs 20 is carried out by causing a lower section of the concealing cover means 3 attached to the seat back to be extended toward a location under the seat cushion 2, pulling the elastic belts 30 toward the forward portion of the seat cushion 2, causing the hooking sections 312 of the first hook means 31 to be engaged with portions of corresponding zigzag springs 20 which are adjacent the pan frame section 2b, then pulling the elastic belts 30 toward the rear end portion of the seat cushion 2, and causing the hooking sections 322 of the second hook means 32 to be engaged with portions of the corresponding zigzag springs 20 which are adjacent the cross shaft 2c. Thus, the space between the rear end portion of the seat back and the lower end portion of the seat cushion can be concealed by the concealing cover means 3.

Figure 5:
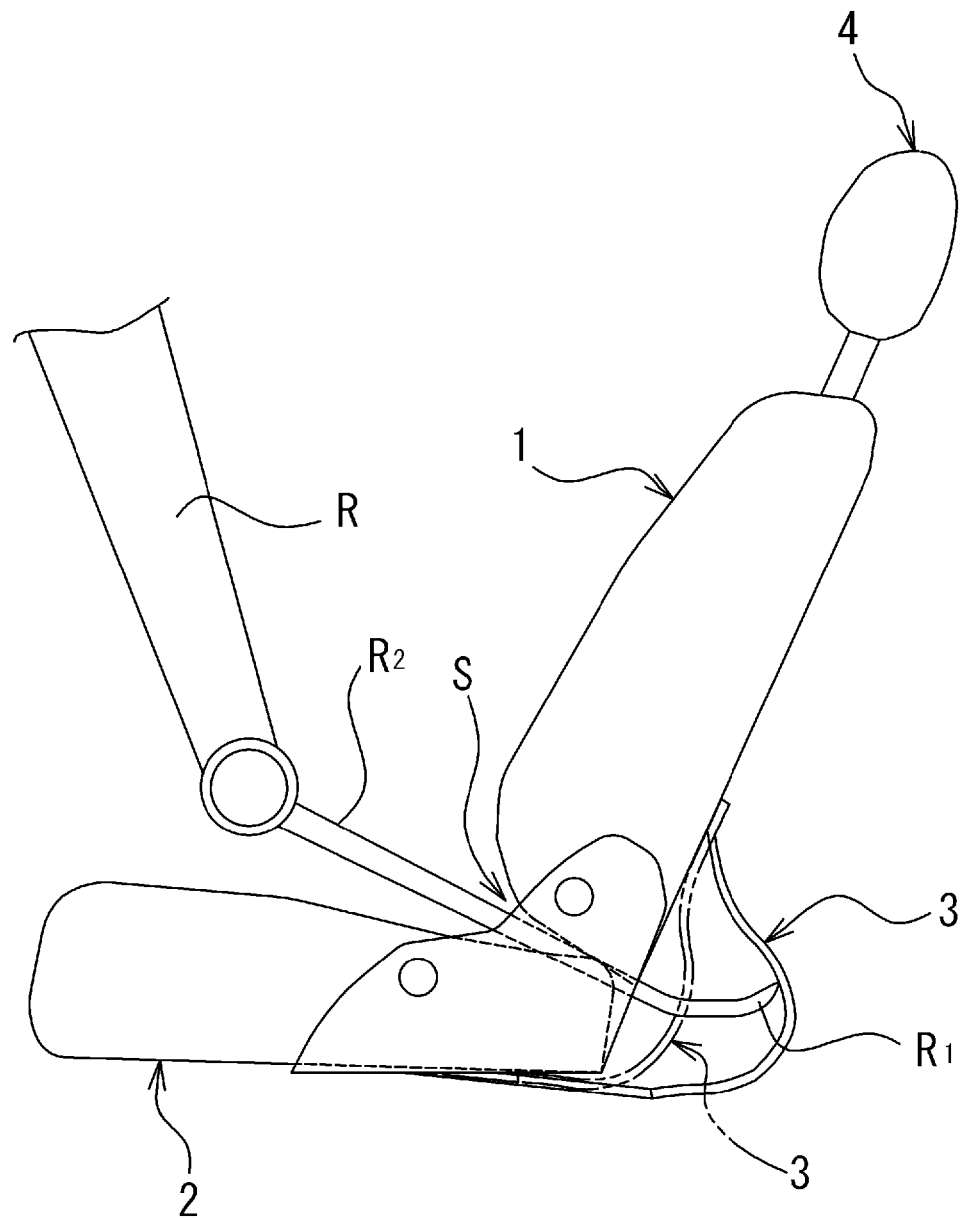
FIG. 5 is a schematic side view which is of assistance in explaining transporting of the vehicle seat of FIG. 1 by a lifter.

Transporting of the vehicle seat constructed as discussed above is carried out by using a lifter. Referring now to FIG. 5, a tip end $R_1$ of a lifting arm $R_2$ of the lifer R is inserted through the space S between the seat back 1 and the seat cushion 2 from the front side of the vehicle seat, when the transporting of the vehicle seat is to be carried out. At this time, the concealing cover means 3 (indicated in FIG. 5 by chain double-dashed lines) is pushed by the tip end $R_1$ of the lifting arm $R_2$ and operatively bulged rearward as shown in FIG. 5 by solid lines, while pulling the elastic belts rearward. In this condition, the vehicle seat can be transported by the lifter R. Incidentally even if an insertion amount of the tip end $R_1$ of the lifting arm $R_2$ is increased, the concealing cover means 3 can be further bulged rearward, since the concealing cover means 3 is coupled to the elastic belts and the elastic belts are further pulled rearward. Thus, the vehicle seat can be positively supported by the lifting arm $R_2$. Incidentally, in FIG. 5, reference numeral 4 denotes a head rest supported to the seat back 1.

As discussed above, the concealing cover body 3a which is formed of the needle-punched fabric is reinforced by the lining plate 3b, so that the concealing cover means 3 can be prevented from being damaged by the tip end $R_1$ of the lifting arm $R_2$. Moreover, the concealing cover means 3 is coupled to the elastic belts and always pulled forward by the elastic belts, so that the concealing cover means 3 can always conceal the space S between the seat back 1 and the seat cushion 2 while adding the appearance of the vehicle seat, and can be easily restored to the original state after the concealing cover means 3 is released from the tip end $R_1$ of the lifting arm $R_2$.

The coupling of the concealing cover means 3 to the seat cushion 2 through the elastic belts is carried out by merely causing the hooking sections of the first and second hook means to be engaged with the portions of the zigzag springs. Therefore, it is possible to easily and stably couple the concealing cover means 3 to the seat cushion 2.

While the two elastic belts are employed in the illustrated example, the number of the elastic belts is not limited to two. Three or more elastic belts may be employed. This makes it possible to cause the concealing cover means to be further stably bulged rearward when the concealing cover means is pushed rearward by the tip end of the lifting arm, and makes it possible to cause the original shape of the concealing cover means to be positively maintained when the concealing cover means is released from the tip end of the lifting arm and restored to the original state. Moreover, only one elastic belt may be employed. While the belts have the length which allows the belts to extend to the forward portion of the seat cushion from the concealing cover body, be returned back and extend rearward as discussed above, each of the belts may have a relatively short length and may be provided at the only free end thereof with a hook means.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

What is claimed is:

1. A vehicle seat comprising:

a seat cushion;

a seat back supported to said seat cushion in such a manner that a space is left between a rear end portion of said seat cushion and a lower end portion of said seat back;

said seat back including a cushioned padding, and a back trim covering a region of said cushioned padding which includes back, left and right sides of said cushioned padding;

said back trim comprising a trim frame;

said trim frame having a plurality of spaced apart projecting pins projecting therefrom;

hem means having a plurality of spaced apart holes;

a concealing cover means for concealing said space from a rear side of said vehicle seat;

said concealing cover means having upper and lower sections;

said concealing cover means being attached at an upper edge portion of said upper section thereof to a lower portion of said trim frame through said hem means by causing said projecting pins of said trim frame to be penetrated through said upper edge portion of said concealing cover means, causing said holes of said hem means to be fitted on said projecting pins of said trim frame, and causing tip end portions of said projecting pins, which are projected from said holes of said hem means, to be riveted over said hem means; and at least one elastic belt having first and second ends;

said first end of said at least one elastic belt being attached to a lower edge portion of said lower section of said concealing cover means; and said at least one elastic belt being extended toward a location under said seat cushion and attached at said second end thereof to a bottom portion of said seat cushion, so that said concealing cover means is extended to said location under said seat cushion and can conceal said space between said rear end portion of said seat cushion and said lower end portion of said seat back.

2. A vehicle seat according to claim 1, wherein the number of said at least one elastic belt is plural, said plural elastic belts having the same length, being attached at first ends thereof to said lower edge portion of said lower section of said concealing cover means so as to be spaced apart from each other, extended from said lower edge portion of said lower section of said concealing cover means in parallel with each other, and attached at second ends thereof to said bottom portion of said seat cushion.

3. A vehicle seat according to claim 2, wherein said seat cushion comprises a seat cushion frame having front and rear frame sections, and cushion springs stretched between said front and rear frame sections, and wherein said second ends of said plural elastic belts are provided with hook means each having a hooking section of a substantially J-shape as viewed from the side, said hooking section being caught by corresponding one of said cushion springs.

4. A vehicle seat according to claim 3, wherein said concealing cover means is reinforced by a lining plate which is attached onto an inner surface of said concealing cover means.

5. A vehicle seat according to claim 2, wherein each of said plural elastic belts has a length which allows an elastic belt to extend to a forward section of said seat cushion from said concealing cover means, be returned back and extend rearward, and is provided with first and second hook means, said first hook means including a slit and a first hooking section, said elastic belt being received through said slit of said first hook means, said second hook means including a second hooking section and attached to a second end of said elastic belt, said first hooking section being caught by a region of said bottom portion of said seat cushion which is adjacent said forward section of said seat cushion, and said second hooking section being caught by a region of said bottom portion of said seat cushion which is adjacent said rear end portion of said seat cushion.

6. A vehicle seat according to claim 5, wherein said concealing cover means is reinforced by a lining plate which is attached onto an inner surface of said concealing cover means.

7. A vehicle seat according to claim 2, wherein said concealing cover means is reinforced by a lining plate which is attached onto an inner surface of said concealing cover means.

8. A vehicle seat according to claim 1, wherein said seat cushion comprises a seat cushion frame having front and rear frame sections, and cushion springs stretched between said front and rear frame sections, and wherein said second end of said at least one elastic belt is provided with a hook means having a hooking section of a substantially J-shape as viewed from the side, said hooking section being caught by one of said cushion springs.

9. A vehicle seat according to claim 8, wherein said concealing cover means is reinforced by a lining plate which is attached onto an inner surface of said concealing cover means.

10. A vehicle seat according to claim 1, wherein said at least one elastic belt has a length which allows said at least one elastic belt to extend to a forward section of said seat cushion from said concealing cover means, be returned back and extend rearward, and is provided with first and second hook means, said first hook means including a slit and a first hooking section, said at least one elastic belt being received through said slit of said first hook means, said second hook means including a second hooking section and attached to said second end of said at least one elastic belt, said first hooking section being caught by a region of said bottom portion of said seat cushion which is adjacent said forward section of said seat cushion, and said second hooking section being caught by a region of said bottom portion of said seat cushion which is adjacent said rear end portion of said seat cushion.

11. A vehicle seat according to claim 10, wherein said concealing cover means is reinforced by a lining plate which is attached onto an inner surface of said concealing cover means.

12. A vehicle seat according to claim 1, wherein said concealing cover means is reinforced by a lining plate which is attached onto an inner surface of said concealing cover means.

* * * * *